United States Patent [19]

Parker

[11] Patent Number: 5,292,151
[45] Date of Patent: Mar. 8, 1994

[54] SELF PIERCING COVER ASSEMBLY FOR AIR BAG HAVING DEFORMABLE DEFLECTOR SHIELD

[75] Inventor: Thomas Parker, Strafford, N.H.

[73] Assignee: Davidson Textron Inc., Dover, N.H.

[21] Appl. No.: 19,894

[22] Filed: Feb. 19, 1993

[51] Int. Cl.⁵ .................. B60R 21/20; B60R 21/22
[52] U.S. Cl. ................... 280/728 B; 280/732; 83/544; 83/588
[58] Field of Search ............... 280/728 R, 728 B, 732; 220/267, 277, 279, 280, 284; 83/588, 544

[56] References Cited

U.S. PATENT DOCUMENTS

| | | | |
|---|---|---|---|
| 420,535 | 2/1890 | Glasier | 83/588 |
| 740,693 | 10/1903 | Pugh | 83/588 |
| 937,611 | 10/1909 | Kawasaki | 83/588 |
| 1,365,070 | 1/1921 | Zealand | 83/588 |
| 3,387,526 | 6/1968 | Neilsen | 83/588 |
| 3,811,355 | 5/1974 | Cole | 83/544 |
| 4,989,896 | 2/1991 | DiSalvo | 280/728 B |
| 5,035,444 | 7/1991 | Carter | 280/732 |
| 5,046,758 | 9/1991 | Rafferty et al. | 280/728 B |

*Primary Examiner*—Karin L. Tyson

[57] ABSTRACT

A self piercing cover assembly for concealing an air bag restraint system in a vehicle passenger compartment has a retractable cutter blade that is attached to the underside of an instrument panel next to front end of an invisible door beneath the instrument panel. When the air bag inflates, the cutter blade is pushed up by a deflector shield against the bias of springs and cuts through the instrument panel at several locations making it easier for the door to swing open. The deflector shield is then bent and broken off or deformed by the inflating air bag to provide a shield for protecting against contact with the sharp edges of the cutter blade. The shield and cutter blade retract under the action of the springs so that the shielded cutting edge is below the surface of the instrument panel to provide primary protection against contact with the sharp edges of the cutter blade after the air bag collapses.

16 Claims, 6 Drawing Sheets

SELF PIERCING COVER ASSEMBLY FOR AIR BAG HAVING DEFORMABLE DEFLECTOR SHIELD

BACKGROUND OF THE INVENTION

This invention relates generally to air bag restraint systems and more particularly to a cover assembly for concealing the air bag restraint system in a vehicle passenger compartment.

SUMMARY OF THE INVENTION

U.S. Pat. 5,035,444 granted to James C. Carter July 30, 1991 discloses a self piercing cover assembly for concealing an air bag restraint system in a vehicle passenger compartment. The cover assembly has a smooth outer cover layer with a layer of foam elastomer between the cover layer and a load bearing insert that has a hinged door. The cover assembly also includes a three sided cutter on the end of a pivot arm that is hinged on the insert. The pivoted cutter is stored between the closed door so that it is pivoted upward and cuts through the foam elastomer and cover layers at the front and side edges of the door making it easier for the door to swing open when the air bag inflates. When fully inflated, the air bag bends the pivot arm so that the cutter and hinged door are retained in a raised position against a windshield to protect against passenger contact with the cutting edges after the air bag collapses.

The object of this invention is to provide a self piercing cover assembly for an air bag that protect against passenger contact with the cutting edges after the air bag collapses irrespective of the position of the hinged door.

A feature and advantage of the self piercing cover assembly of this invention is that the self piercing cover assembly does not require permanent deformation of any part for protecting against passenger contact with the cutting edges after the air bag collapses.

Another feature and advantage of the self piercing cover assembly of this invention is that the self piercing cover assembly does not require the proximity of the windshield for protecting against passenger contact with the cutting edges after the air bag collapses.

Still another feature and advantage of the self piercing cover assembly of this invention is that the self piercing cover assembly does not require that the door be retained in a raised or any other particular position to protect against contact with the cutting edges after the air bag collapses.

Yet another feature of the self piercing cover assembly of this invention is that the cutter automatically retracts as the air bag collapses so that the cutting edges are below the surface of the cover assembly to protect against contact with the cutting edges after the air bag collapses.

Still yet another feature of the self piercing cover assembly of this invention is that the cutter blade is substantially isolated from the passenger compartment when the air bag collapses so that the occupants are completely protected against contact with any sharp edges of the cutter blade.

Still yet another feature of the self piercing cover assembly of some embodiments of this invention is that the cutter is pushed up by a deflector that is deformed to provide a shield to further protect against contact with the sharp cutting edges of the cutter after the air bag collapses.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
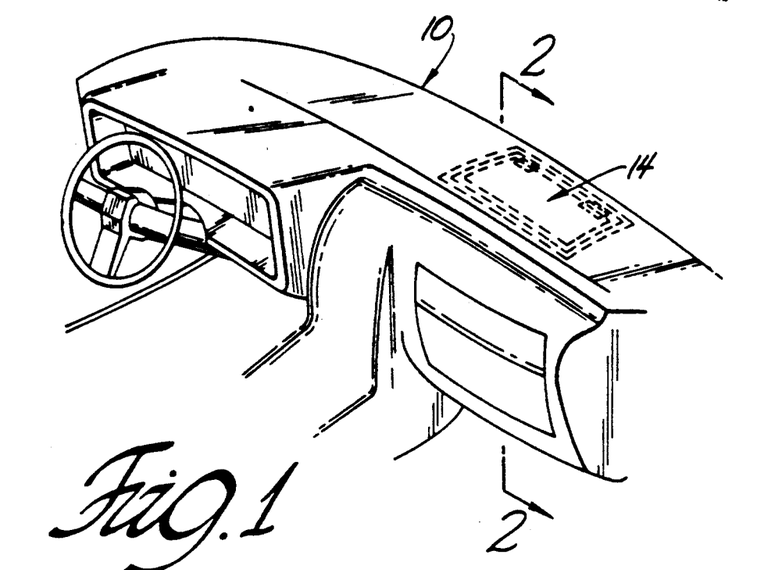
FIG. 1 is a perspective view of an instrument panel assembly including a self piercing cover assembly in accordance with this invention.

Referring now to the drawing, FIG. 1 shows an instrument panel 10 having an air bag restraint system 12 located beneath a self piercing cover assembly 14 constructed in accordance with this invention. In this particular instance, the air bag restraint system 12 is located beneath the shelf portion of the instrument panel on the passenger side of the vehicle. However the self piercing cover assembly of this invention can be used on the driver side as part of the steering wheel; on either side as part of the front or facing portion of the instrument panel; or as part of any decorative panel in the passenger compartment.

The air bag restraint system 12 includes an air bag housing 16 that encloses a gas generator 18 for supplying an inflatant to an air bag 20 that is collapsed, folded and packed in the housing 16. The folded air bag 20 includes an inlet end 22 connected to a passage for flow of the inflatant from the gas generator 18 into the air bag. The air bag also includes a nose end 24 at the opposite end of the folds that is positioned to operate the self piercing cover assembly 14 of this invention when the air bag 20 inflates.

Figure 2:
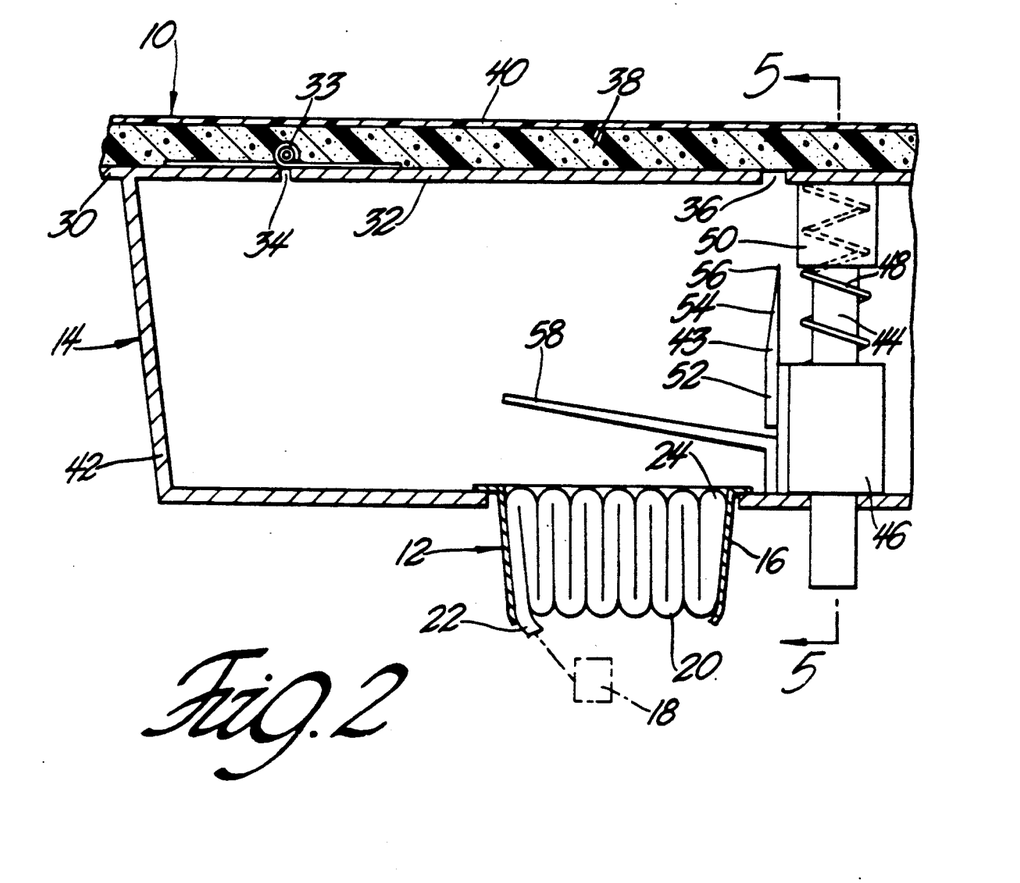
FIG. 2 is a fragmentary sectional view of a first embodiment of the invention taken substantially along the line 2—2 of FIG. 1 looking in the direction of the arrows.

The cover assembly 14 comprises a support 30 of sheet metal or other relatively stiff material that is secured beneath the instrument panel 10 preferably by being insert molded as part of the instrument panel itself. The support 30 includes a door 32 that closes a rectangular opening 34 in the support 30. The door 32 is connected to the support 30 by a hinge 33 at the back end. The front end of the door 32 is spaced from an edge of the rectangular opening 34 to maintain a slot 36 at the front end of the door 32 when it is in the closed position as shown in FIG. 2.

The outer surface of the support 30 and the hinged door 32 is bonded to a layer of a suitable energy absorbing elastomeric foam, such as urethane foam that forms a cushion 38 in an underlying relationship to a polymeric skin or shell 40 of vinyl or the like that forms an outer decorative surface of the instrument panel 10 The skin 40 does not have any break lines, tear lines or weakened sections that are visually perceivable from the exterior of the instrument panel 10 so as to detract from its aesthetic appearance. Thus the self piercing cover assembly 14 of this invention provides an invisible door arrangement for the deployment of the air bag 20.

Figure 3:
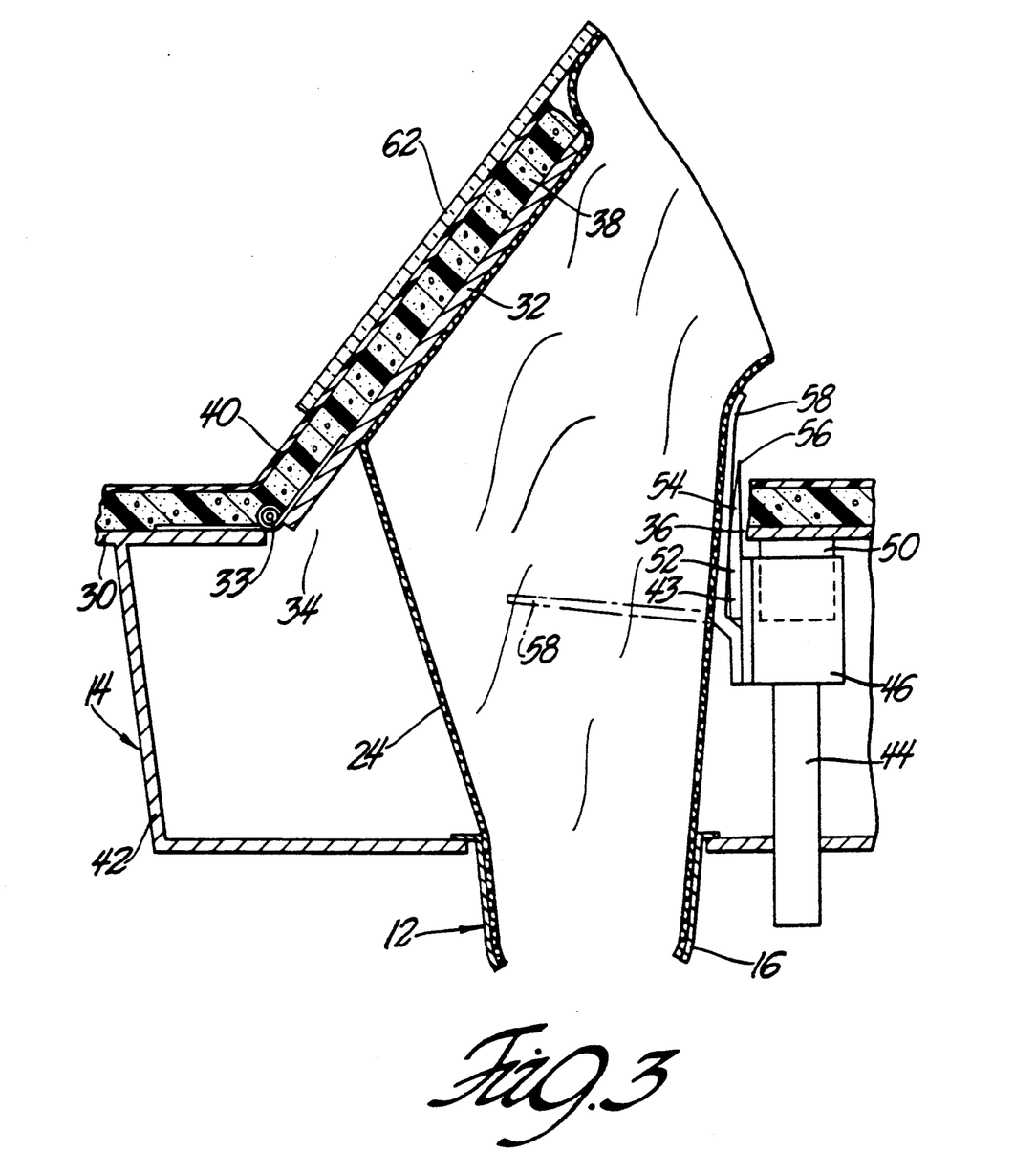
FIG. 3 is a fragmentary sectional view showing the deflector shield of the first embodiment deformed to provide a shield for the extended cutter blade after the cutter blade has cut through the instrument panel as a result of air bag inflation.
Figure 4:
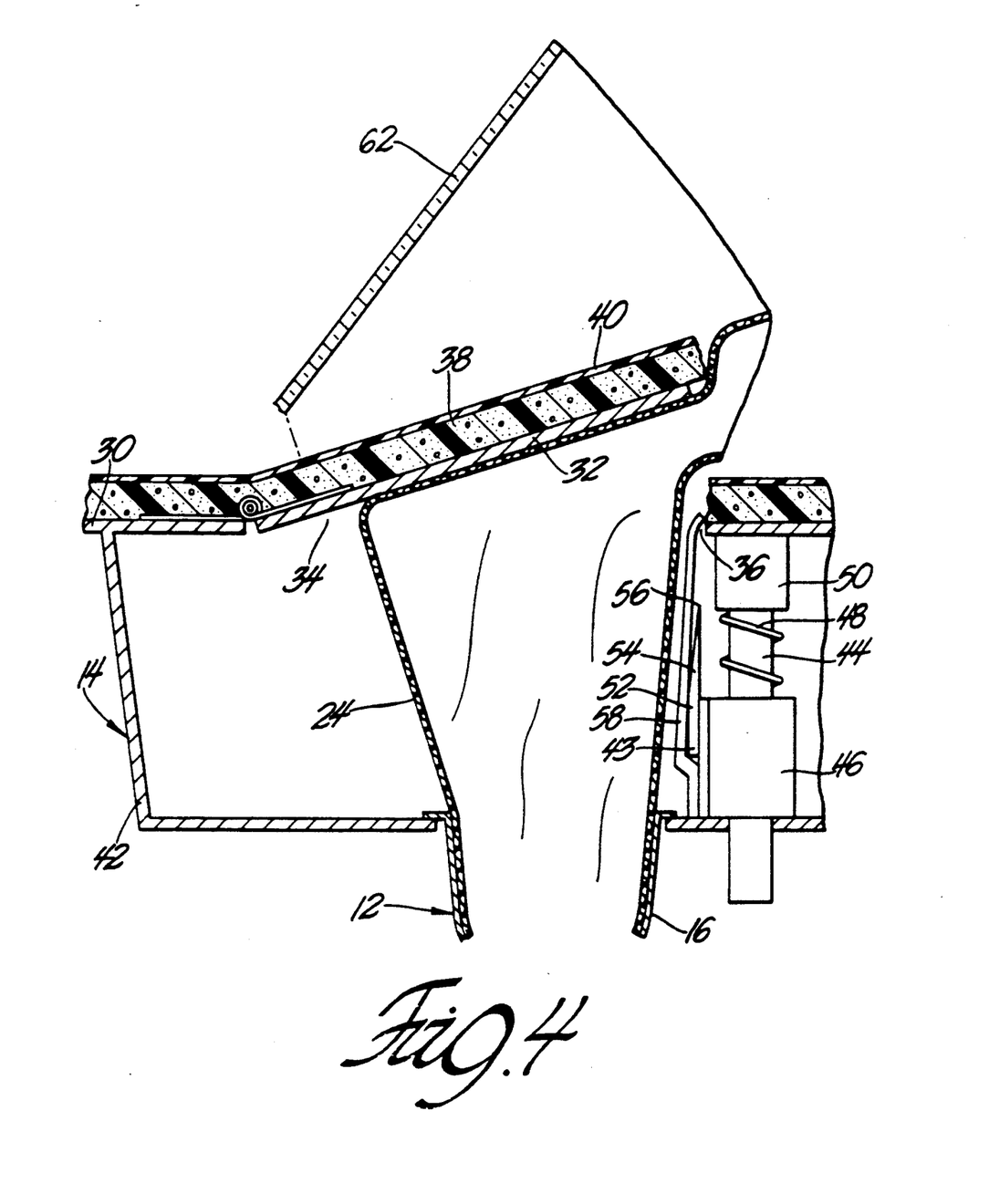
FIG. 4 is a fragmentary sectional view showing the shielded cutter blade of the first embodiment retracted after the air bag collapses.

The support 30 of the cover assembly 14 has a depending bracket 42 that holds the air bag housing 16 beneath the rectangular opening 34 in spaced alignment with the door 32. A piercing member 43 is disposed in the space between the door 32 and the air bag 20 that is provided by the bracket 42. The piercing member 43 is attached to the underside of the support 30 near the slot 36 by a slide so that it translates from a retracted position beneath the instrument panel 10 as shown in FIGS. 2 and 4 to an extended position projecting through the instrument panel 10 as shown in FIG. 3. The slide comprises a plurality of posts 44 attached to the support 30 and bracket 42 and collars 46 surrounding the posts 44 that are attached to the piercing member 43. The slide also includes coil springs 48 around the posts 44 that bias the collars 46 down against the bracket 42 to retain the piercing member 42 in the retracted position shown in FIGS. 2 and 4. The slide also includes stops 50 surrounding the upper ends of the posts 44 and coil springs 48 that engage the collars 46 to limit the outward movement of the piercing member 43 as shown in FIG. 3.

The piercing member 43 comprises a cutter blade 52 that is aligned with the slot 36 at the front end of the door 32. The cutter blade 52 has a saw tooth cutting edge 54 that provides a plurality of sharp cutting points 56. These cutting points 56 cut through the cushion 38 and skin 40 at several locations to provide a tear line at the front end of the door 32 when the piercing member 43 is raised to the extended position shown in FIG. 3.

The piercing member 43 is raised by means of a deflector shield 58 that is attached to the piercing member 43 in cantilever fashion. The deflector shield 58 is disposed in the space beneath the support 30 provided by the bracket 42 so that it lies between the air bag 30 that is packed in the air bag housing 16 and the door 32. The deflector shield 58 is made of a deformable material, such as sheet metal, so that it can be deformed to an upright orientation to provide a shield for protecting against contact with the sharp edges of the cutter blade 52 as shown in FIGS. 3 and 4. When the deflector shield 58 is deformed to the upright orientation, it is adjacent the exposed side of the cutter blade 52, that is, the side that faces toward the door 32. The deflector shield 58 may be scored or otherwise weakened to promote bends in the deflector shield 58 at desired locations so that the deflector shield bends over the top of the cutter blade 52 as shown in FIG. 4.

The self piercing cover assembly 14 operates in the following manner. When the gas generator 18 is triggered due to a predetermined vehicle deceleration, the air bag 20 inflates at the nose end 24 first and then progressively back toward the inlet end 22. Consequently the nose end 24 engages the shield 58 and the initial load of the inflating air bag pushes the deflector shield 58 outwardly against the bias of the coil springs 44 until the piercing member 42 reaches its extended position shown in FIG. 3. In this extended position, the cutting blade 52 projects through the slot 36 and the cutting edge 54 cuts through the cushion 38 and skin 40 at several locations. This forms a greatly weakened tear line at the front of the door 32 that is easily ruptured by the door 32 itself as it is subsequently pivoted outwardly by the force of the inflating air bag 20. In this regard, it should be noted that the size and number of the sharp cutting points 56 can be varied to meet the particular needs of the materials that are used in the cushion 38 and skin 40 of the instrument panel 10.

When the tear line is formed, the collars 46 engage the stops 50 limiting outward movement of the piercing member 43 so that the inflating air bag cannot push it beyond the extended position. When the piercing member 42 stops moving, the force of the inflating air bag 20 deforms the deflector shield 58 from its original generally horizontal orientation shown in phantom to an upright orientation adjacent the exposed side of the cutting blade 52 as shown in solid lines in FIG. 3.

The inflating air bag 20 also pushes the door 32 open until it is stopped by the windshield 62. The cushion 38 and skin 40 of the instrument panel 10 may be opened at the sides of the door 32 in any suitable manner, such as by the force of the door 32 itself possibly in combination with invisible side tear lines in the skin 40.

Another alternative is to use cutting cables or wires to cut through the cushion 38 and skin 40 of the instrument panel 10 at the sides of the door as the door is being pivoted open by the inflating air bag 20 as disclosed and explained in U.S. patent application Ser. No. 07/990,028 filed Dec. 14, 1992 and assigned to the assignee of this invention. The cutting cables or wires provide the additional benefit of tethering the door 32 after the instrument panel 10 has been opened up.

Still another alternative is to use a piercing member that also cuts tear lines at the side of the door 32, such as the second embodiment of the invention that is explained below in connection with FIG. 6.

In any event, an important feature of the invention is that the cutter blade 52 of the piercing member 43 retracts below the surface of the skin 40 that is next to the opening 34 as the air bag 20 collapses and the coil springs 48 overcome the force of the air bag 20 as shown in FIG. 4. This substantially isolates the cutter blade 52 from the passenger compartment and protects the occupants against contact with the sharp points 56 of the cutting edge 54 of the cutter blade 52. Moreover, the bent deflector shield 58 protects the occupants against contact with the sharp points 56 and cutting edge 54 of the retracted cutter blade 52 even further.

Consequently the occupants are completely protected against contact with the sharp edges of the cutter blade 52 in any position of the door 42 and irrespective of the proximity of the windshield 62. Thus the self piercing cover assembly 14 of this invention is quite versatile and universal in that it can be used in a great variety of applications and locations in the passenger compartment.

Figure 6:
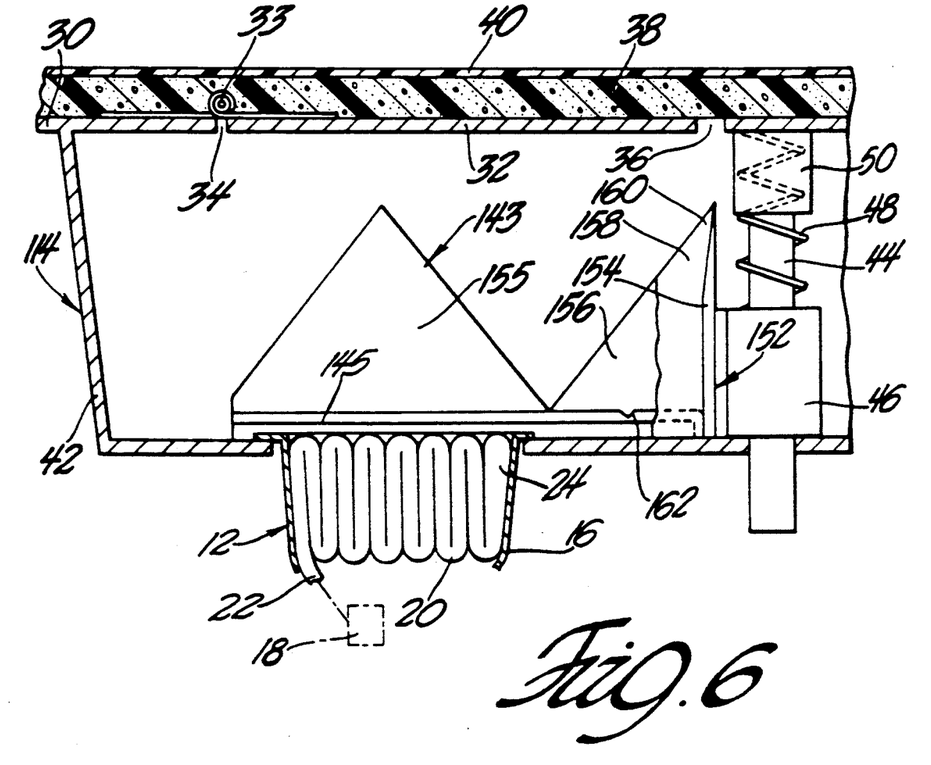
FIG. 6 is a fragmentary sectional view similar to FIG. 2 of a second embodiment of the invention.

Referring now to FIG. 6, it shows a second embodiment of a self piercing cover assembly 114 constructed in accordance with this invention that be used in conjunction with the instrument panel 10 and air bag restraint system 12 shown in FIG. 1. It can also be used in other environments in which the self piercing cover assembly 14 can be used, such as those discussed above.

The self-piercing cover assembly 114 of this second embodiment has a modified piercing member 143 and a modified deflector shield 145 that are different. The remaining components, however, are the same as those of the self-piercing cover assembly 14 and corresponding components are identified with the same numerals.

The modified piercing member 143 is disposed in the space between the door 32 and the air bag 20 that is provided by the bracket 42. The piercing member 143 is attached to the underside of the support 30 near the slot 36 by a slide so that it translates from a retracted position beneath the instrument panel 10 as shown in FIG. 6 to an extended position projecting through the instrument panel 10 such as that shown in FIG. 3 in connection with the piercing member 43 of the first embodiment.

The modified piercing member 143 comprises a cutter blade 152 that is three sided so that it cuts three tear lines. The front side 154 is aligned with the slot 3 at the front end of the door 32. The right and left sides 155 and 156 are aligned with respective slots at the right and left sides of the door 32 (not shown). The cutter blade 152 has a saw tooth cutting edge 158 that provides a plurality of sharp cutting points 160. These cutting points 160 cut through the cushion 38 and skin 40 at several locations to provide tear lines at the front end and sides of the door 32 when the piercing member 143 is raised to the extended position.

The piercing member 143 is raised by means of a deflector shield 145 that is attached to the piercing member 143 in cantilever fashion. The deflector shield 145 is disposed in the space beneath the support 30 provided by the bracket 42 so that it lies between the air bag 30 that is packed in the air bag housing 16 and the door 32. The deflector shield 145 is made of a deformable material and it is indented or scored to provide a fracture line 155 near the front blade 154 so that the deflector shield 153 fractures at a desired location during air bag deployment.

The self piercing cover assembly 114 operates in the following manner. When the gas generator 18 is triggered due to a predetermined vehicle deceleration, the air bag 20 inflates at the nose end 24 first and then progressively back toward the inlet end 22. Consequently the nose end 24 engages the deflector shield 145 and the initial load of the inflating air bag pushes the deflector shield 145 outwardly against the bias of the coil springs 44 until the piercing member 143 reaches its extended position where the three sided cutting blade 152 projects through the slots at the front and sides of the door 32 and the cutting edge 154 cuts through the cushion 38 and skin 40 at several locations. This forms a greatly weakened tear line at the front end and sides of the door 32 that are easily ruptured by the door 32 itself as it is subsequently pivoted outwardly by the force of the inflating air bag 20. As before the size and number of the sharp cutting points 160 can be varied to meet the particular needs of the materials that are used in the cushion 38 and skin 40 of the instrument panel 10.

When the tear lines are formed, the collars 46 engage the stops 50 limiting outward movement of the piercing member 143 so that the inflating air bag cannot push it beyond the extended position. When the piercing member 143 stops moving, the force of the inflating air bag 20 bends the deflector shield 145 up from its original orientation shown in solid lines in FIG. 6 until the deflector shield 155 breaks off at the fracture line 155. The inflating air bag 20 also pushes the door 32 open until it is stopped by the windshield 62.

In any event, an important feature of this second embodiment of the invention is that the cutter blade 152 of the piercing member 143 retracts to its original position below the surface of the skin 40 that is next to the opening 34 as the air bag 20 collapses and the coil springs 48 overcome the force of the air bag 20 such as shown in FIG. 4 in connection with the piercing member 43. This substantially isolates the cutter blade 152 from the passenger compartment and protects the occupants against contact with the sharp points 160 of the cutting edge 158 of the three sided cutter blade 152.

Thus this second embodiment also protects the occupants against contact with the sharp edges of the three sided cutter blade 152 in any position of the door 42 and irrespective of the proximity of the windshield 62. The self piercing cover assembly 114 is also quite versatile and universal in that it can also be used in a great variety of applications and locations in the passenger compartment.

While this second embodiment shows a self piercing cover assembly 114 that has a three sided cutter blade 152 and a deflector shield that fractures during use, it is to be understood that either of these modifications can be used without the other. That is, a three sided cutter blade can be used in conjunction with other deflector shields such as the deflector shield that is described above in connection with the first embodiment or the deflector shield that is described below in conjunction with a third embodiment. Similarly, a deflector shield that is designed to fracture during use can be used in conjunction with other cutter blades such as the cutter blade that is described above in connection with the first embodiment and the cutter blade that is described below in conjunction with the third embodiment of the invention.

Figure 7:
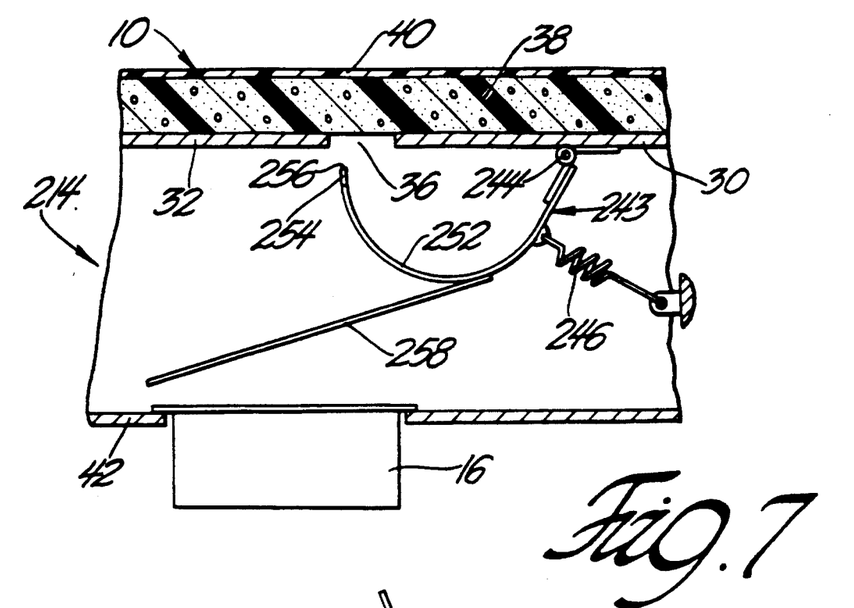
FIG. 7 is a fragmentary sectional view similar to FIG. 2 of a third embodiment of the invention.
Figure 8:
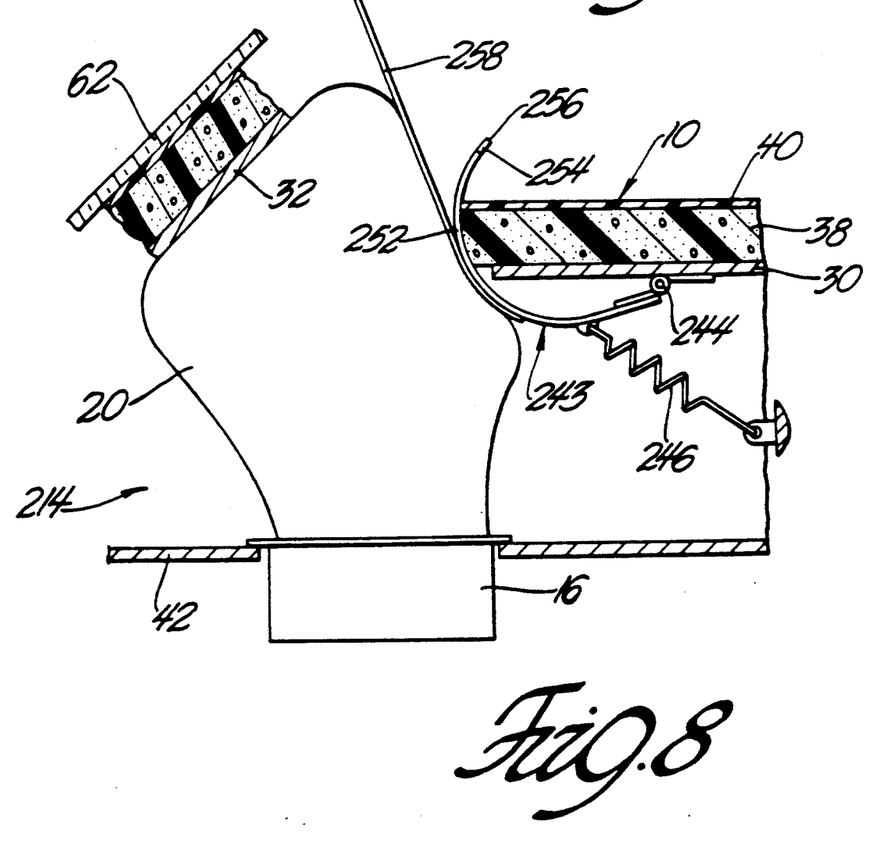
FIG. 8 is a fragmentary sectional view of the third embodiment showing the deflector shield deformed to provide a shield for the extended cutter blade after the cutter blade has cut through the instrument panel as a result of air bag inflation.
Figure 9:
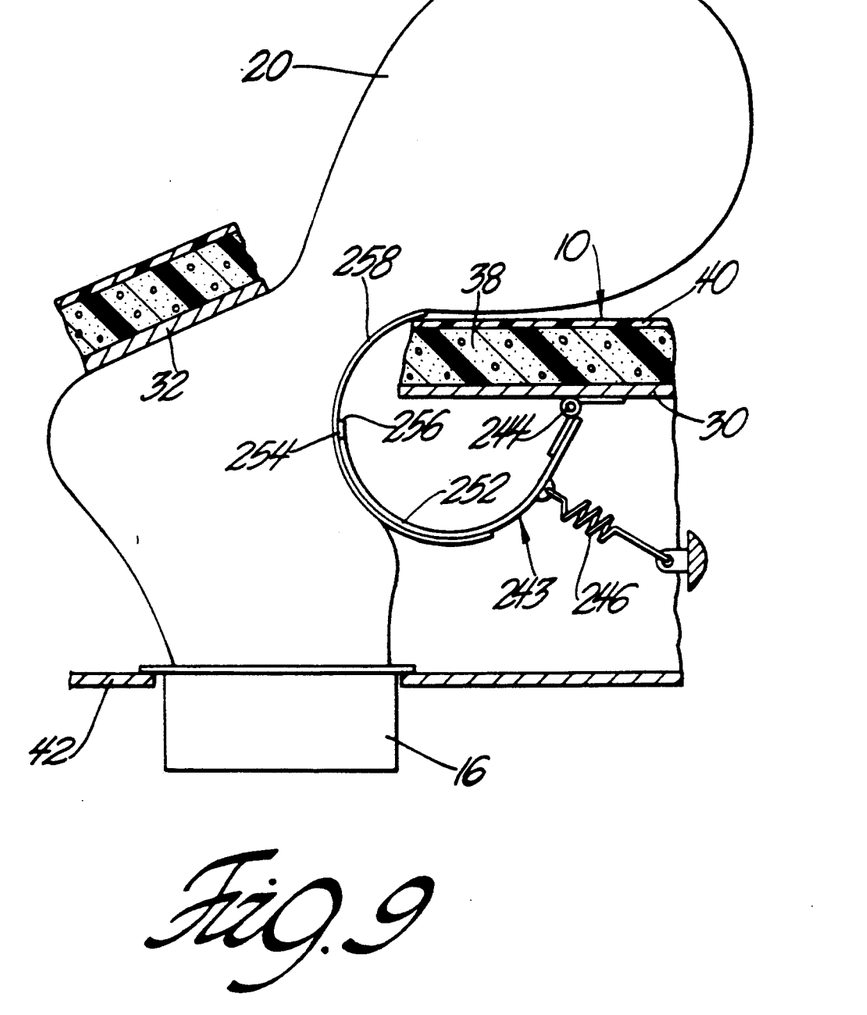
FIG. 9 is a fragmentary sectional view of the third embodiment showing the shielded cutter blade retracted after the air bag collapses.

Referring now to FIGS. 7-9, a third embodiment of a self piercing cover assembly 214 constructed in accordance with this invention is shown. This third embodiment can also be used in conjunction with the instrument panel 10 and air bag restraint system 12 shown in FIG. 1 and in other environments in which the self piercing cover assembly 14 can be used, such as those discussed above.

The cover assembly 214 comprises an identical support 30 of sheet metal or other relatively stiff material that is secured beneath the instrument panel 10 preferably by being insert molded as part of the instrument panel itself. The support 30 likewise includes a door 32 that closes a rectangular opening 34 in the support 30 and the door 32 is connected to the support 30 by a hinge at the back end (not shown). The front end of the door 32 is spaced from an edge of the rectangular opening 34 to maintain a slot 36 at the front end of the door 32 when it is in the closed position as shown in FIG. 7.

The outer surface of the support 30 and the hinged door 32 is bonded to a layer of a suitable energy absorbing elastomeric foam, such as urethane foam that forms a cushion 38 in an underlying relationship to a polymeric skin or shell 40 of vinyl or the like that forms an outer decorative surface of the instrument panel 10 The skin 40 does not have any break lines, tear lines or weakened sections that are visually perceivable from the exterior of the instrument panel 10 so as to detract from its aesthetic appearance. Thus the self piercing cover assembly 214 of this third embodiment also provides an invisible door arrangement for the deployment of the air bag 20.

The support 30 of the cover assembly 14 has a depending bracket 42 that holds the air bag housing 16 beneath the rectangular opening 34 in spaced alignment with the door 32. A piercing member 243 is disposed in the space between the door 32 and the air bag 20 that is provided by the bracket 42. The piercing member 243 is attached to the underside of the support 30 near the slot 36 by a hinge 244 so that it swings from a retracted position beneath the instrument panel 10 as shown in FIGS. 7 and 9 to an extended position projecting through the instrument panel 10 as shown in FIG. 8. The piercing member 243 has a eyelet near the hinge 244 for attaching a coil spring 246. The other end of the coil spring 246 is attached to the bracket 42 to biasingly retain the piercing member 243 in the retracted position shown in FIGS. 7 and 9.

Figure 5:
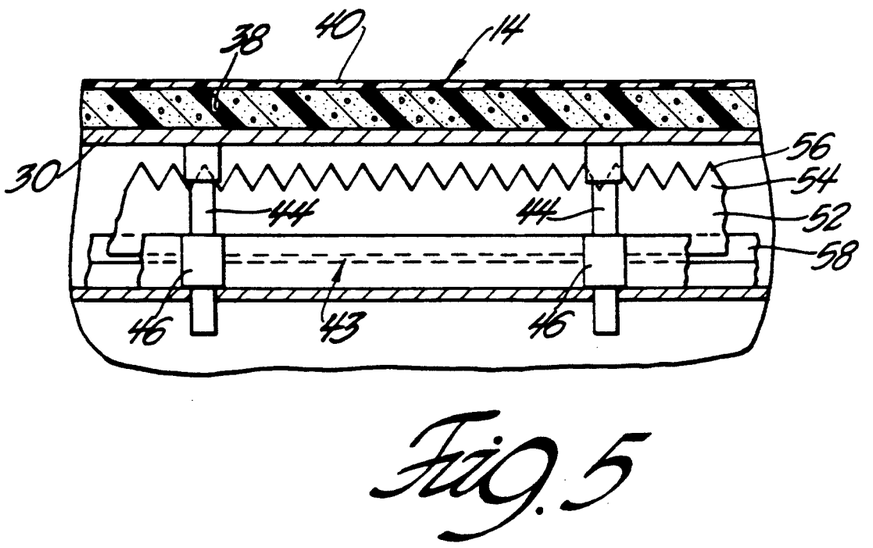
FIG. 5 is a section taken substantially alone the line 5—5 of FIG. 2 looking in the direction of the arrows.

The piercing member 243 comprises a curved cutter blade 252 that has a saw tooth cutting edge 254 is like the cutting edge 54 shown in FIG. 5 and that is aligned with the slot 36 at the front end of the door 32. The saw tooth cutting edge 254 provides a plurality of sharp cutting points 256 that cut through the cushion 38 and skin 40 at several locations to provide a tear line at the front end of the door 32 when the piercing member 243 is raised to the extended position shown in FIG. 83.

The piercing member 243 is raised by means of a deflector shield 258 that is attached to the bottom of the curved cutter blade 252 in cantilever fashion. The deflector shield 258 is disposed in the space beneath the support 30 provided by the bracket 42 so that it lies between the air bag 20 that is packed in the air bag housing 16 and the door 32. The deflector shield 258 is made of a deformable material, such as sheet metal, so that it can be deformed up and over the curved cutter blade 252 to provide a shield for protecting against contact with the sharp edges of the cutter blade 252 as shown in FIG. 9. When the deflector shield 258 is deformed, it is adjacent the exposed side of the cutter blade 152, that is, the side that faces toward the door 32.

The self piercing cover assembly 214 operates in the following manner. When the gas generator 18 is triggered due to a predetermined vehicle deceleration, the air bag 20 inflates at the nose end first and then progressively back toward the inlet end. Consequently the nose end engages the deflector shield 258 and the initial load of the inflating air bag pushes the deflector shield 258 outwardly against the bias of the coil spring 246 until the piercing member 243 reaches its extended position shown in FIG. 8. In this extended position, the cutting blade 252 projects through the slot 36 and the cutting edge 254 cuts through the cushion 38 and skin 40 at several locations. This forms a greatly weakened tear line at the front of the door 32 that is easily ruptured by the door 32 itself as it is subsequently pivoted outwardly by the force of the inflating air bag 20. In this regard, it should be noted again that the size and number of the sharp cutting points 256 can be varied to meet the particular needs of the materials that are used in the cushion 38 and skin 40 of the instrument panel 10.

When the tear line is formed, the curved blade 252 engages the instrument panel 10 limiting outward movement of the piercing member 243 as shown in FIG. 8 so that the inflating air bag cannot push it beyond the extended position. When the piercing member 243 stops moving, the force of the inflating air bag 20 bends the deflector shield 258 from its original orientation and shape shown in FIG. 7 up and over the exposed side of the cutting blade 252 as shown in FIG. 9.

The inflating air bag 20 also pushes the door 32 open until it is stopped by the windshield 62 as shown in FIG. 8. The cushion 38 and skin 40 of the instrument panel 10 may be opened at the sides of the door 32 in any suitable manner, such as by the force of the door 32 itself possibly in combination with invisible side tear lines in the skin 40, with cutting cables or wires to cut through the cushion 38 and skin 40 of the instrument panel 10 at the sides of the door as the door is being pivoted open by the inflating air bag 20 or with other suitable alternatives as indicated above.

In any event, it is also an important feature of this third embodiment that the curved cutter blade 252 of the piercing member 243 retracts below the surface of the skin 40 that is next to the opening 34 as the air bag 20 collapses and the coil spring 246 overcomes the force of the air bag 20 as shown in FIG. 9. This substantially isolates the curved cutter blade 252 from the passenger compartment and protects the occupants against contact with the sharp points 256 of the cutting edge 254 of the cutter blade 252. Moreover, the bent deflector shield 258 protects the occupants against contact with the sharp points 56 and cutting edge 54 of the retracted cutter blade 52 even further.

Consequently the occupants are completely protected against contact with the sharp edges of the curved cutter blade 252 in any position of the door 42 and irrespective of the proximity of the windshield 62. Thus the self piercing cover assembly 214 of this invention is also quite versatile and universal in that it can be used in a great variety of applications and locations in the passenger compartment.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A self piercing cover assembly for concealing an air bag in a vehicle passenger compartment comprising:
   a support that is adapted for securement beneath a decorative panel in a vehicle passenger compartment;
   a door that closes an opening in the support for deployment of an air bag;
   the door having a rear end that is connected to the support by a hinge and a front end that is spaced from an edge of the opening in the support to maintain a slot at the front end of the door when the door is closed;
   the outer surface of the support and the hinged door being in an underlying relationship to a covering that forms an outer surface of the decorative panel,
   the support having means for holding an air bag housing beneath the opening in alignment with the door and for providing space beneath the door;
   piercing means disposed in the space beneath the door and attached to an underside of the support for movement between a retracted position beneath the decorative panel and an extended position protruding through the decorative panel;

means holding the piercing means in the retracted position;

the piercing means including cutting edge means aligned with the slot to cut through the covering of the decorative panel when the piercing means moves to the extended position; and deflector means disposed in the space beneath the door and attached to the piercing means so that the piercing means is moved outwardly by inflation of an air bag stored in the air bag housing impacting on the deflector means so that the cutting edge means projects through the slot and cuts through the covering at the front end of the door before the door itself is pivoted outwardly by the force of the inflating air bag, stop means for limiting outward movement of the piercing means, and the deflector means including means for allowing deformation so that the deflector means is deformed outwardly by the force of the inflating air bag to provide a shield for the cutting edge means when outward movement of the piercing means stops.

2. The self piercing cover assembly for concealing an air bag in a vehicle passenger compartment as defined in claim 1 wherein:

the means holding the piercing means in the retracted position comprises spring means; and the piercing means are retractable so that the cutting edge means recedes below the surface of the decorative panel as the air bag collapses and the spring means overcomes the force of the air bag to protect against contact with the cutting edges means of the piercing means.

3. The self piercing cover assembly for concealing an air bag in a vehicle passenger compartment as defined in claim 1 wherein the piercing means is attached to the support by a slide so that the piercing means translates between the retracted position and the extended position.

4. The self piercing cover assembly for concealing an air bag in a vehicle passenger compartment as defined in claim 1 wherein the piercing means is attached to the support by a hinge so that the piercing means swings between the retracted position and the extended position.

5. A self piercing cover assembly for concealing an air bag in a vehicle passenger compartment comprising:

a support that is adapted for securement beneath a decorative panel in a vehicle passenger compartment;

a door that closes an opening in the support for deployment of an air bag;

the door having a rear end that is connected to the support by a hinge and a front end that is spaced from an edge of the opening in the support to maintain a slot at the front end of the door when the door is closed;

the outer surface of the support and the hinged door being in an underlying relationship to a covering that forms an outer surface of the decorative panel, the support having means for holding an air bag housing beneath the opening in alignment with the door and for providing space beneath the door;

piercing means disposed in the space beneath the door and attached to an underside of the support for movement between a retracted position beneath the decorative panel and an extended position protruding through the decorative panel;

means holding the piercing means in the retracted position;

the piercing means including cutting edge means aligned with the slot to cut through the covering of the decorative panel when the piercing means moves to the extended position; and deflector means disposed in the space beneath the door and attached to the piercing means so that the piercing means is moved outwardly by inflation of an air bag stored in the air bag housing impacting on the deflector means so that the cutting edge means projects through the slot and cuts through the covering at the front end of the door before the door itself is pivoted outwardly by the force of the inflating air bag, stop means for limiting outward movement of the piercing means and the deflector means having a fracture line so that it is bent and broken off by the force of the inflation air bag when outward movement of the piercing means stops.

6. A self piercing cover assembly for concealing an air bag in a vehicle passenger compartment comprising:

a support that is adapted for securement beneath a decorative panel in a vehicle passenger compartment;

a door that closes an opening in the support for deployment of an air bag;

the door having a rear end that is connected to the support by a hinge and a front end that is spaced from an edge of the opening in the support to maintain a slot at the front end of the door when the door is closed;

the outer surface of the support and the hinged door being formed in an underlying relationship to a covering comprising a polymeric skin that forms an outer surface of the decorative panel, the support having means for holding an air bag housing beneath the opening in alignment with the door and for providing space beneath the door;

piercing means disposed in the space beneath the door and attached to an underside of the support for movement between a retracted position beneath the decorative panel and an extended position protruding through the decorative panel;

means holding the piercing means in the retracted position;

the piercing means including cutting edge means aligned with the slot to cut through the covering of the decorative panel when the piercing means moves to the extended position;

deflector means disposed in the space beneath the door and attached to the piercing means so that the piercing means is moved outwardly by inflation of an air bag stored in the air bag housing impacting on the deflector means so that the cutting edge means projects through the slot and cuts through the covering at the front end of the door before the door itself is pivoted outwardly by the force of the inflating air bag, stop means for limiting outward movement of the piercing means, the deflector means including means for allowing deformation so that the deflector means is deformed outwardly by the force of the inflating air bag when outward movement of the piercing means stops to provide a shield that is juxtaposed an exposed side of the cutting edge means and extends beyond the cutting edge means to protect against contact with sharp edges of the cutting edge means.

7. The self piercing cover assembly for concealing an air bag in a vehicle passenger compartment as defined in claim 6 wherein;
the piercing means is attached to the support by a slide so that the piercing means translate between the retracted position and the extended position, and
the deflector means is attached to the piercing means adjacent its bottom.

8. The self piercing cover assembly for concealing an air bag in a vehicle passenger compartment as defined in claim 6 wherein:
the piercing means is attached to the support by a hinge so that the piercing means swings between the retracted position and the extended position, and
the deflector means is attached to the piercing means adjacent its bottom.

9. A self piercing cover assembly for concealing an air bag in a vehicle passenger compartment comprising:
a support that is adapted for securement beneath a decorative panel in a vehicle passenger compartment;
the support including a door that closes an opening in the support for deployment of an air bag;
the door having a rear end that is connected to the support by a hinge and a front end that is spaced from an edge of the opening in the support to maintain a slot at the front end of the door when the door is closed;
the outer surface of the support and the hinged door being bonded to an elastomeric cushion formed in an underlying relationship to a plymeric skin that forms an outer surface of the decorative panel,
the support having a depending bracket for holding an air bag housing beneath the opening in alignment with the door and providing space beneath the door;
piercing means disposed in the space beneath the door and attached to an underside of the support for movement between a retracted position beneath the decorative panel and an extended position protruding through the decorative panel;
spring means holding the piercing means in the retracted position;
the piercing means including cutting edge means aligned with the slot to cut through the cushion and skin of the decorative panel when the piercing means moves to the extended position;
deflector means disposed in the space beneath the door and attached to the piercing means so that the piercing means is moved outwardly to the extended position by the initial inflation of an air bag stored in the air bag housing impacting on the deflector mans so that the cutting edge means projects through the slot and cuts through the cushion and skin and forms a tear line at the front end of the door that is subsequently ruptured by door as it is pivoted outwardly by the force of the inflating air bag.
the piercing means being retractable so that the cutting edge means recede below the surface of the decorative panel as the air bag collapses and the spring means overcomes the force of the air bag to protect against contact with sharp edges of the cutting edge means,
stop means for limiting outward movement of the piercing means, and
the deflector means including means for allowing deformation so that the deflector means is deformed outwardly by the air bag to shield the cutting blade means when outward movement of the piercing means stops.

10. The self piercing cover assembly for concealing an air bag in a vehicle passenger compartment as defined in claim 9 wherein:
the deflector means is attached to the piercing means below the cutting edge means and configured so that the deformed deflector means provides a shield that is juxtaposed an exposed side of the cutting edge means and extends beyond the cutting edge means to protect against contact with the sharp edges of the cutting edge means.

11. The self piercing cover assembly for concealing an air bag in a vehicle passenger compartment as defined in claim 9 wherein;
the piercing means is attached to the support by a slide so that the piercing means translates between the retracted position and the extended position, and
the deflector means is attached to the piercing means adjacent its bottom.

12. The self piercing cover assembly for concealing an air bag in a vehicle passenger compartment as defined in claim 9 wherein:
the piercing means is attached to the support by a hinge so that the piercing means swings between the retracted position and the extended position, and
the deflector means is attached to the piercing means adjacent its bottom.

13. The self piercing cover assembly for concealing an air bag in a vehicle passenger compartment as defined in claim 9 wherein the piercing means includes a three sided cutter blade.

14. A self piercing cover assembly for concealing an air bag in a vehicle passenger compartment comprising:
a support that is adapted for securement beneath a decorative panel in a vehicle passenger compartment;
the support including a door that closes an opening in the support for deployment of an air bag;
the door having a rear end that is connected to the support by a hinge and a front end that is spaced from an edge of the opening in the support to maintain a slot at the front end of the door when the door is closed;
the outer surface of the support and the hinged door being bonded to an elastomeric cushion formed in an underlying relationship to a polymeric skin that forms an outer surface of the decorative panel,
the support having a depending bracket for holding an air bag housing beneath the opening in alignment with the door and providing space beneath the door;
piercing means disposed in the space beneath the door and attached to an underside of the support for movement between a retracted position beneath the decorative panel and an extended position protruding through the decorative panel;

spring means holding the piercing means in the retracted position;

the piercing means including a cutting blade having several pointed sharp cutting edges aligned with the slot to cut through the cushion and skin of the decorative panel when the piercing means moves to the extended position;

deflector means disposed in the space beneath the door and attached to the piercing means so that the piercing means is moved outwardly by the initial inflation of the air bag impacting on the deflector means so that the cutting blade projects through the slot and cuts through the cushion and skin at several locations to form a tear line at the front end of the door that is subsequently ruptured by door as it is pivoted upwardly by the force of the inflating air bag, stop means for limiting outward movement of the piercing means, the deflector means including means for allowing deformation so that the deflector means is deformed outwardly by the air bag to shield the cutting edges when outward movement of the piercing means stops, and the piercing means being retractable so that the cutting blade recedes below the surface of the decorative panel as the air bag collapses and the spring means overcomes the force of the air bag to protect against contact with the sharp cutting edges of the cutting blade, and the deflector means being attached to the piercing means below the sharp cutting edge and configured so that the deformed deflector means provides a shield that is juxtaposed an exposed side of the cutting blade and extends beyond the sharp cutting edges means to protect against contact with the sharp edges of the cutting blade.

15. The self piercing cover assembly for concealing an air bag in a vehicle passenger compartment as defined in claim 14 wherein;

the piercing means is attached to the support by a slide so that the piercing means translates between the retracted position and the extended position, and the deflector means is attached to the piercing means adjacent its bottom.

16. The self piercing cover assembly for concealing an air bag in a vehicle passenger compartment as defined in claim 14 wherein:

the piercing means is attached to the support by a hinge so that the piercing means swings between the retracted position and the extended position, and the deflector means is attached to the piercing means adjacent its bottom.

* * * * *